(12) United States Patent
Schilling et al.

(10) Patent No.: US 11,009,155 B2
(45) Date of Patent: May 18, 2021

(54) FIRE ZONE HOSES AND METHODS FOR FORMING THE SAME

(71) Applicant: Eaton Intelligent Power Limited, Dublin (IE)

(72) Inventors: Patrick Alan Schilling, Jackson, MI (US); Justin Troy Straley, Chelsea, MI (US); Megan Sara Simpson, East Lansing, MI (US)

(73) Assignee: Eaton Intelligent Power Limited, Dublin (IE)

( * ) Notice: Subject to any disclaimer, the term of this patent is extended or adjusted under 35 U.S.C. 154(b) by 28 days.

(21) Appl. No.: 16/095,959

(22) PCT Filed: Apr. 25, 2017

(86) PCT No.: PCT/US2017/029244
§ 371 (c)(1),
(2) Date: Oct. 24, 2018

(87) PCT Pub. No.: WO2017/189478
PCT Pub. Date: Nov. 2, 2017

(65) Prior Publication Data
US 2019/0154174 A1    May 23, 2019

Related U.S. Application Data

(60) Provisional application No. 62/327,106, filed on Apr. 25, 2016.

(51) Int. Cl.
*F16L 11/12* (2006.01)
*F16L 57/04* (2006.01)
(Continued)

(52) U.S. Cl.
CPC ............. *F16L 11/125* (2013.01); *F16L 33/01* (2013.01); *F16L 33/025* (2013.01); *F16L 57/04* (2013.01)

(58) Field of Classification Search
CPC ....... F16L 11/125; F16L 33/01; F16L 33/025; F16L 57/04
(Continued)

(56) References Cited

U.S. PATENT DOCUMENTS 1,630,895 A * 5/1927 Herbst ..................... F16L 33/01
285/222.4
3,547,162 A * 12/1970 Schaerer ............... F16L 59/029
138/125

(Continued)

*Primary Examiner* — Craig M Schneider
*Assistant Examiner* — David R Deal
(74) *Attorney, Agent, or Firm* — Benesch, Friedlander, Coplan & & Aronoff LLP

(57) ABSTRACT

This disclosure relates to a hose, such as a fire zone hose, that can include an inner tube, a thermal protection sleeve and a braided member. The inner tube can form a flow path for conveying fluid. The thermal protection sleeve can be disposed around the inner tube. The thermal protection sleeve can include an inner surface and an outer surface such that the inner tube is positioned inwards from an inner surface of the thermal protection sleeve. The braided member can be disposed around the thermal protection sleeve, such that the braided member deforms the outer surface of the thermal protection sleeve. Additionally, the hose can include a braid retainer. The braid retainer can be disposed around an end of the braided member to secure the braided member to the thermal protection sleeve.

4 Claims, 4 Drawing Sheets

(51) Int. Cl.
*F16L 33/01* (2006.01)
*F16L 33/025* (2006.01)

(58) Field of Classification Search
USPC ......................................................... 138/124
See application file for complete search history.

(56) References Cited

U.S. PATENT DOCUMENTS

| | | | | |
|---|---|---|---|---|
| 3,633,629 | A * | 1/1972 | Rider | B29C 53/66 138/127 |
| 4,488,577 | A * | 12/1984 | Shilad | F16L 59/153 138/103 |
| 4,880,036 | A * | 11/1989 | Kitami | F16L 11/08 138/137 |
| 5,183,079 | A * | 2/1993 | Blin | F16L 11/086 138/110 |
| 7,588,057 | B2 * | 9/2009 | Bentley | F16L 11/088 138/127 |
| 8,227,061 | B2 * | 7/2012 | Noda | B32B 1/08 138/123 |
| 8,689,838 | B2 * | 4/2014 | Stroempl | F16L 11/125 138/127 |
| 2008/0017266 | A1 * | 1/2008 | Doshi | F16L 11/086 138/127 |
| 2008/0072984 | A1 * | 3/2008 | Branch | B32B 1/08 138/124 |
| 2011/0000572 | A1 * | 1/2011 | Ramaswamy | B32B 1/08 138/149 |
| 2015/0260328 | A1 * | 9/2015 | Colcombet | B32B 27/322 138/125 |

* cited by examiner

FIRE ZONE HOSES AND METHODS FOR FORMING THE SAME

CROSS-REFERENCED TO RELATED APPLICATION

This application claims the benefit of U.S. Provisional Application No. 62/327,106, filed on Apr. 25, 2016, entitled "FIRE ZONE HOSES AND METHODS FOR FORMING THE SAME", which is incorporated herein by reference in its entirety.

TECHNICAL FIELD

This disclosure generally relates to hoses and methods for forming the same. More specifically, this disclosure relates to fire zone hoses and methods for forming the same.

BACKGROUND

Hoses can be utilized as a flexible device for conveying fluid between two or more components. Hoses have many applications including aircraft or airframe applications. For example, aircraft hoses can be utilized to convey pressurized fuel, oil, hydraulic fluid, or the like. Accordingly, aircraft hoses can be exposed to deleterious fluids due to failure of components, or accidental spillage. Additionally, aircraft hoses can be subjected to relatively hostile ambient conditions. For example, aircraft operation generally provides a relatively demanding ambient temperature range during normal operation due to use in a variety of climates and high altitude. Aircraft hoses can be subjected to high temperatures, when exposed to engine environments, and low temperatures, when exposed to high altitude.

Moreover, some aircraft hoses can be certified for use in fire zones as defined by the Federal Aviation Administration (FAA) or applicable certifying authority. For example, aircraft hoses can be configured to withstand direct flame for a certain period of time (e.g., five minutes or fifteen minutes) in order to be certified as being fire resistant or fire proof. However, existing aircraft hoses suitable for use in fire zones are prone to degradation during exposure to fire, which can impact product capability to meet the fire requirement.

Accordingly, a need exists for alternative fire zone hoses and methods for forming the same.

SUMMARY

In one example, a hose can include an inner tube, a thermal protection sleeve, and a braided member. The inner tube can form a flow path for conveying fluid. The thermal protection sleeve can be disposed around the inner tube. The thermal protection sleeve can include an inner surface and an outer surface. The inner tube can be positioned inwards from an inner surface of the thermal protection sleeve. The braided member can be disposed around the thermal protection sleeve. The braided member can deform the outer surface of the thermal protection sleeve.

In another example, a method for a forming hose can include forming a thermal protection sleeve exterior to an inner tube. The inner tube can form a flow path for conveying fluid. A plurality of carriers can be braided upon the thermal protection sleeve. The carriers can form a braided member having an end. The end of the braided member can be secured with a braid retainer. A cuff can be molded over the end of the braided member and the braid retainer.

DETAILED DESCRIPTION

The present disclosure is directed to a hose, such as a fire zone hose, for conveying fluid throughout fire zone locations in an aircraft. The term "fluid" as used herein can mean a substance, such as a liquid or a gas, that is capable of flowing and that changes its shape when acted upon by a force tending to change its shape. The fire zone hose can include an inner tube. The inner tube can define a flow path for conveying fluid. The fire zone hose can further include a thermal protection sleeve. The thermal protection sleeve can improve the temperature capabilities of the fire zone hose. The fire zone hose can further include a braided member. The braided member can improve the robustness of the thermal protection sleeve during exposure to fire.

Figure 1:
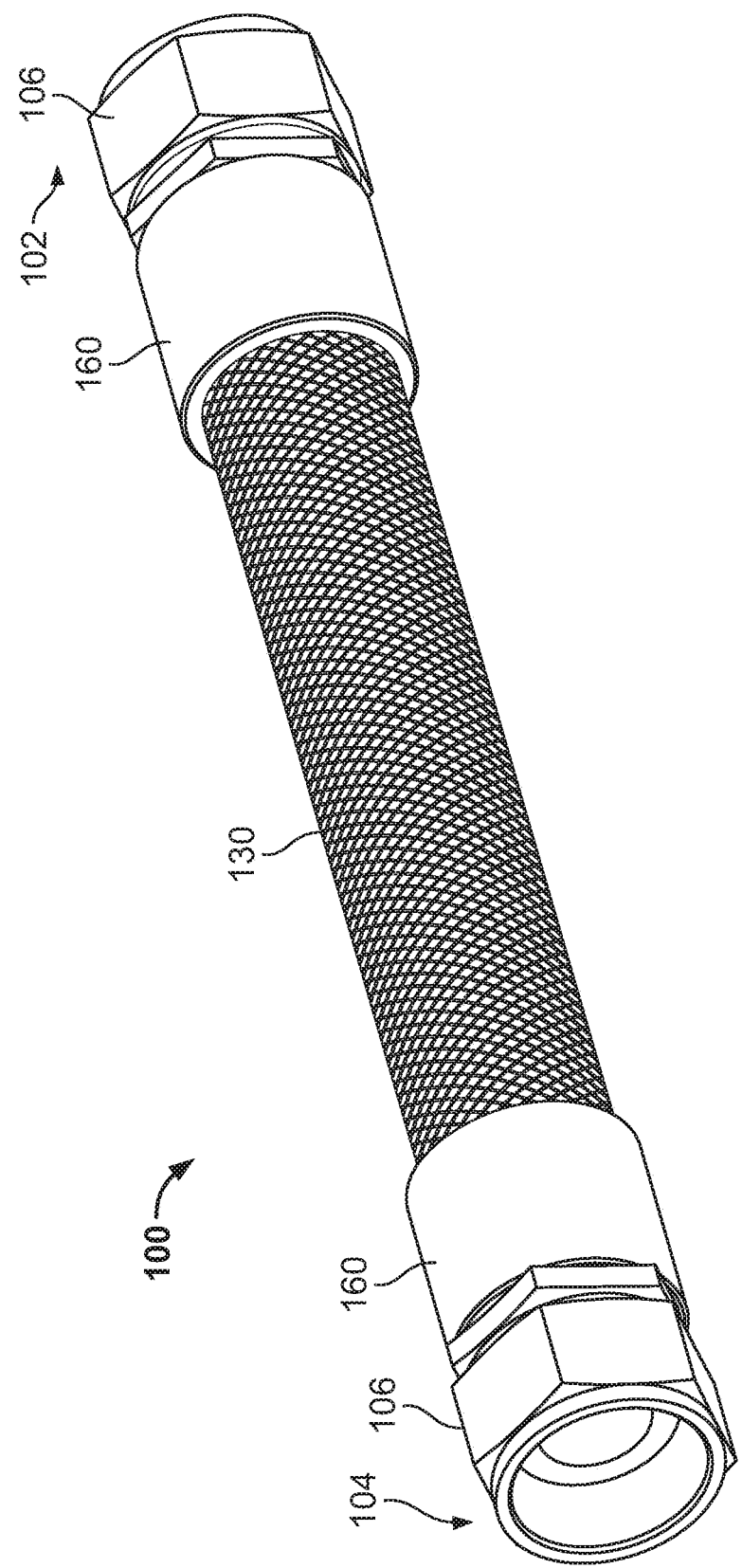
FIG. 1 illustrates an example of a fire zone hose.

FIG. 1 illustrates an example of a fire zone hose 100 according to the present disclosure. In one example, the fire zone hose 100 can be configured to operate within a fire zone of an aircraft. The fire zone hose 100 can be certified as being fire resistant or fire proof. The fire zone hose 100 can extend from a first end 102 to a second end 104. In some examples, the fire zone hose 100 can include a fitting 106 disposed at each of the first end 102 and the second end 104. Each fitting 106 can be configured to mate and form a fluid tight seal with a component within an aircraft. It is noted that, while the fitting 106 is depicted in FIG. 1 as being a straight socket with a nut coupling, the fitting 106 can be any suitable fitting for forming a fluid type seal such as, for example, a fitting including an elbow, a tee, a cross, a nipple, a threaded connector, a snap connector, a flange, a brazed fitting, a welded fitting, swaged fitting, combinations thereof, or the like.

Figure 2:
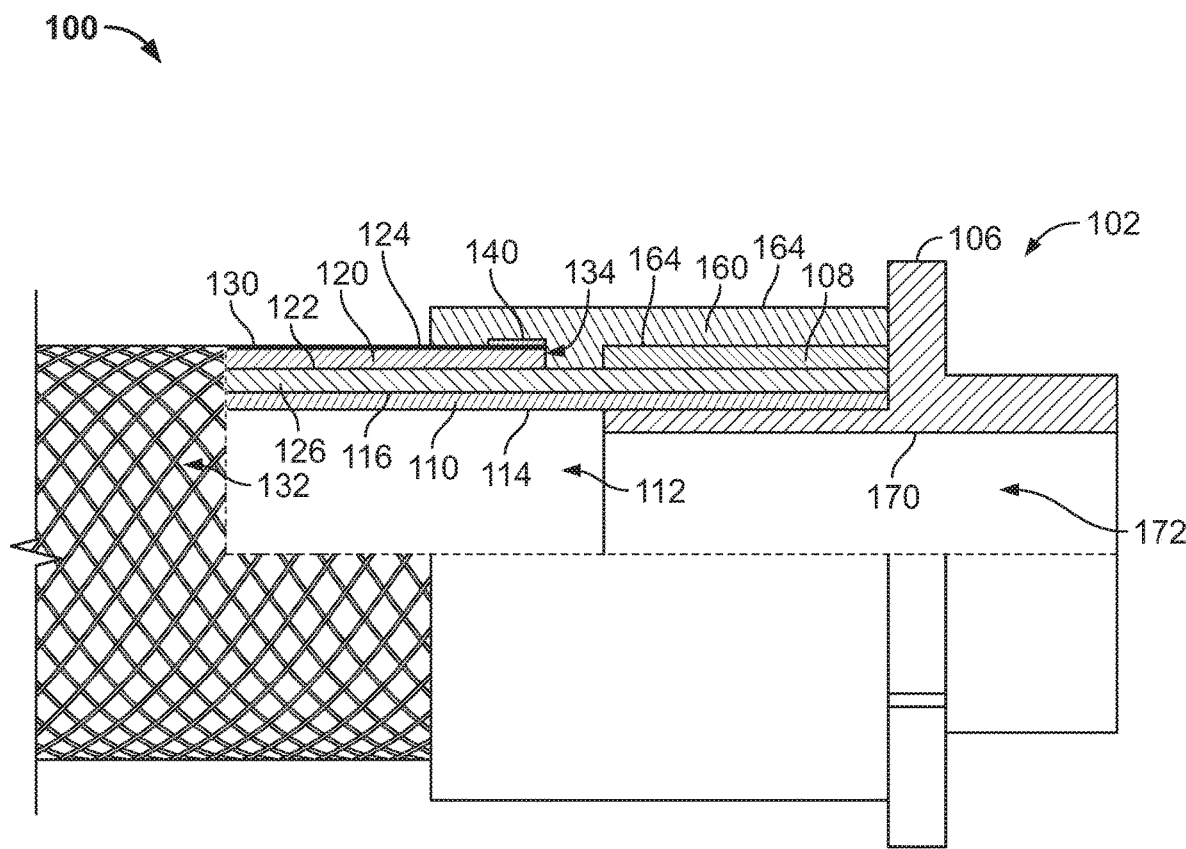
FIG. 2 illustrates an example of a partial cross sectional view of the fire zone hose of FIG. 1.

Referring collectively to FIGS. 1 and 2, the fire zone hose 100 can include an inner tube 110 that forms a flow path 112 for conveying fluid. The inner tube 110 can include an inner surface 114 and an outer surface 116. The inner surface 114 can bound the flow path 112 and substantially contain the fluid within the flow path 112. The inner tube 110 can be formed from any material suitable for substantially containing the fluid in the flow path 112 throughout an operating temperature range of the aircraft. For example, an ambient operating range can be between about −65° Fahrenheit (F) (about −54° Celsius (C)) and about 400° F. (about 204° C.).

The inner tube 112 can be formed from any material suitable for containing aircraft fluids at a given temperature such as, for example, a polymer, Polytetrafluoroethylene (PTFE), or the like. It is noted that, while the inner tube 110 is depicted in FIG. 2 as having a substantially circular cross section, the inner tube 110 can be formed using any shape suitable for defining a fluid flow path such as, but not limited to, substantially oval shaped cross section, polygonal (square, rectangle, etc.) shaped cross section, or the like.

The fire zone hose 100 can include a thermal protection sleeve 120 configured to improve the heat resistant properties of the fire zone hose 100. In some embodiments, the thermal protection sleeve 120 can be a substantially tubular member comprising an inner surface 122 and an outer surface 124. Generally, the thermal protection sleeve 120 can be positioned between the outer surface 116 of the inner tube 110 and the ambient environment of the fire zone hose 100. Accordingly, the operating temperature range of the inner tube 110 can be supplemented by the thermal protection sleeve 120. For example, the thermal protection sleeve 120 can be formed from any material suitable for withstanding a direct flame of up to and exceeding 2,000° F. (about 1,093° C.) for a period of time such as, for example, silicone or silicone compounds.

The fire hose 100 can include one or more reinforcing layers 126. The one or more reinforcing layers 126 can strengthen the inner tube 110. For example, the one or more reinforcing layers 126 can be configured to improve kink resistance, increase an amount of pressure that can be applied to the inner surface 114 of the inner tube 110, or both. Each of the one or more reinforcing layers 126 can be formed from a metallic material such as, but not limited to, stainless steel (e.g., 300 series stainless steel), that is formed into a braid, spiral helix, or the like. In one example, the one or more reinforcing layers 126 can be disposed between the inner tube 110 and the thermal protection sleeve 120. For instance, the one or more reinforcing layers 126 can be bounded by the outer surface 116 of the inner tube 110 and the inner surface 122 of the thermal protection sleeve 122.

The fire zone hose 100 can include a braided member 130. The braided member 130 can improve the robustness of the fire zone hose 100 during exposure to fire. For example, the braided member 130 can be configured to protect the thermal protection sleeve 120 from loss of material caused by temperature during a fire event. Moreover, the braided member 130 can be configured to mitigate flaking of the thermal protective sleeve 120 caused by exposure to high temperatures (e.g., direct flame or fire). The braided member 130 can include a plurality of carriers 132 that are braided around the thermal protection sleeve 120. In one example, the braided member 130 can form the outermost layer of at least a portion of the fire zone hose 100. For instance, the braided member 130 can form the outermost layer of the portion of the fire zone hose 100 disposed between the fittings 106.

Each of the carriers 132 can be formed from one or more metallic wires including a metal such as, for example, stainless steel (e.g., 300 series stainless steel). The braided member 130 can be configured to provide only partial coverage of the thermal protection sleeve 120 such as, for instance, an area of coverage greater than about 5% and less than about 50% in one example, or an area of coverage greater than about 10% and less than about 30% in another example.

Figure 3:
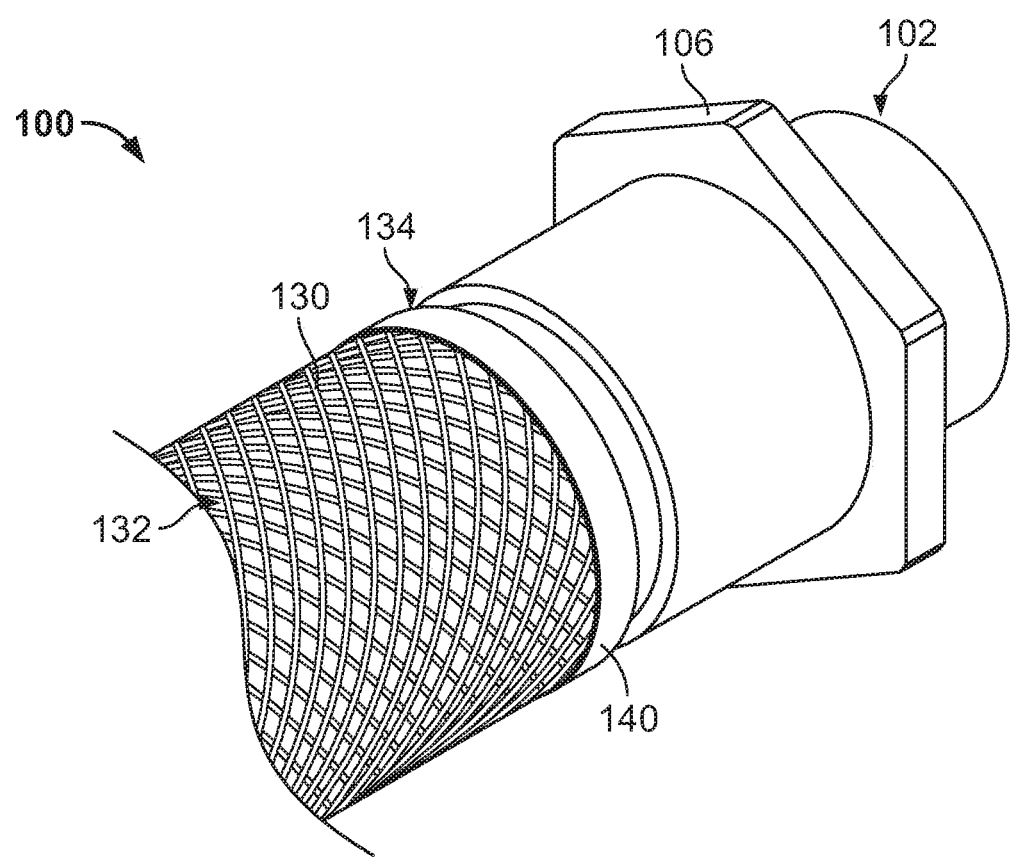
FIG. 3 illustrates an example of a partial view of the fire zone hose of FIG. 1 with a cuff removed.

Referring collectively to FIGS. 2 and 3, the fire zone hose 100 can include a braid retainer 140. The braid retainer 140 can be configured to secure the braided member 130 during assembly, testing, and use. The braid retainer 140 can be formed from any material suitable to apply force to the braided member 130 throughout exposure to extreme temperatures. As is described herein, the braid retainer 140 can be configured to secure an end 134 of the braid retainer 130 using adhesive, compressive members, deformable members, or a combination thereof. For example, the braid retainer 140 can include an adhesive tape formed from adhesive and a high temperature material such as, but not limited to, PTFE, fiberglass, aluminum, stainless steel, or the like. Alternatively or additionally, the braid retainer 140 can include a bonding agent such as, but not limited to, an adhesive, an epoxy, or any other curable coating.

In an even further example, the braid retainer 140 can include an elastic member that can be configured to secure the end 134 of the braided member 130. In on example, the braid retainer 140 can include an elastic band formed from elastic material such as, but not limited to, silicone, fluorosilicone, PTFE, or the like. In another example, the braid retainer 140 can include an external compression spring applied over the end 134 of the braided member 130.

In some examples, the braid retainer 140 can be formed from temperature curable material that can be formed over the braided member 130 and cured to secure the end 134 of the braided member 130 to the thermal protection sleeve 120. In one example, the braid retainer 140 can include a molded boot that can be formed from a curable material such as, for example, silicone. Accordingly, the molded boot can be disposed around the braided member 130 in an uncured state and cured to secure the braided member 130. In another example, the braid retainer 140 can include a shrink sleeve formed from a heat shrinkable material such as, for example, fluorinated ethylene propylene (FEP), fluorosilicone, silicone, polyolefin, PTFE, or the like. Accordingly, the shrink sleeve can be disposed around the braided member 130 in an enlarged state and heated to shrink and secure the braided member 130.

In some examples, the braid retainer 140 can be formed from a substantially rigid material that can be deformed over the braided member 130 to secure an end 134 of the braided member 130 to the thermal protection sleeve 120. For instance, the braid retainer 140 can include a wire member that can be wrapped around the end 134 of the braided member 130. The end 134 of the braided member 130 can be secured to the thermal protection sleeve 120 by deforming, tying, or welding the wire member in place. Alternatively or additionally, the braid retainer 140 can include an adjustable clamp, a zip tie, or the like.

Figure 4:
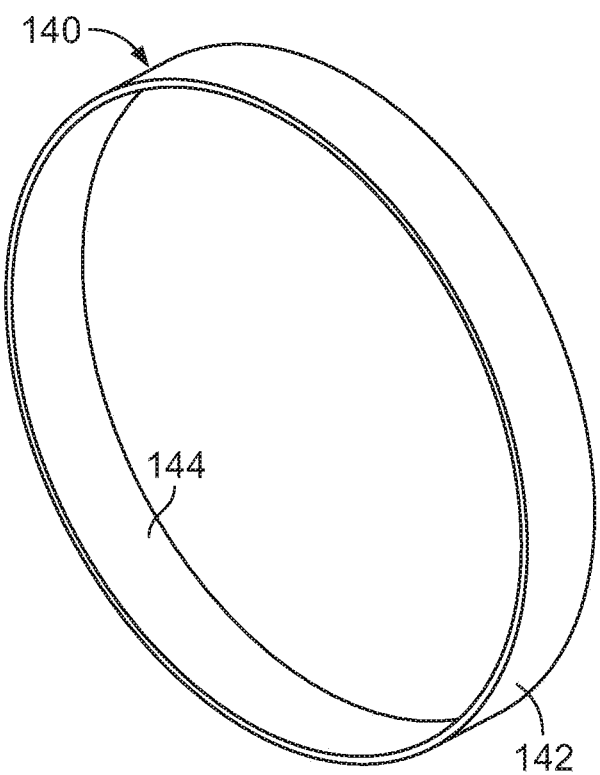
FIG. 4 illustrates an example of a braid retainer.
Figure 5:
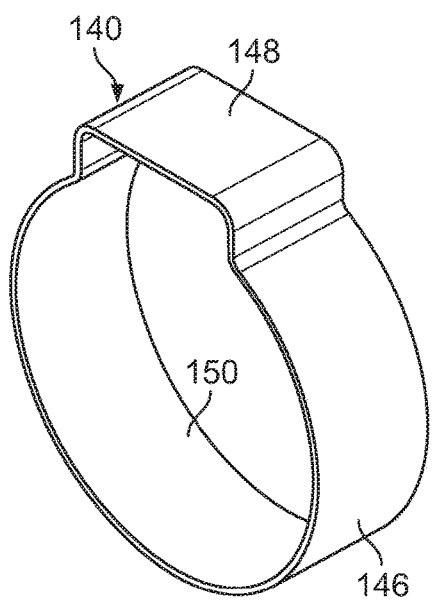
FIGS. 5-8 illustrates an example of a braid retainer.
Figure 6:
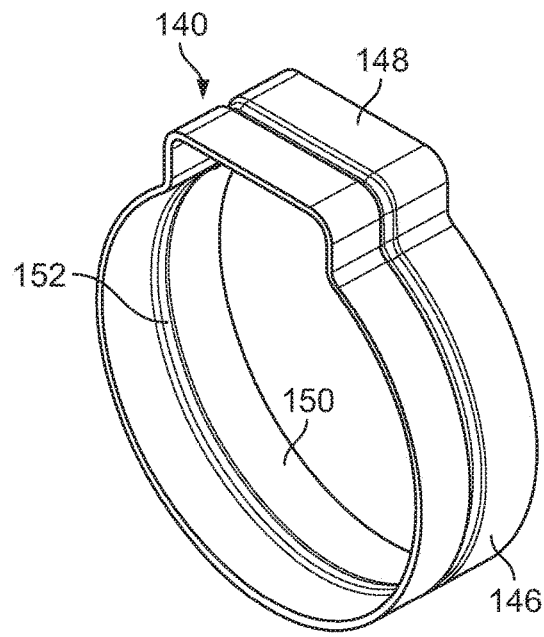
Figure 7:
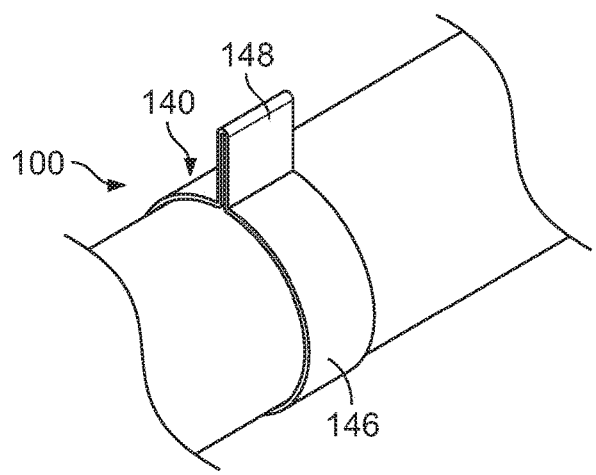
Figure 8:
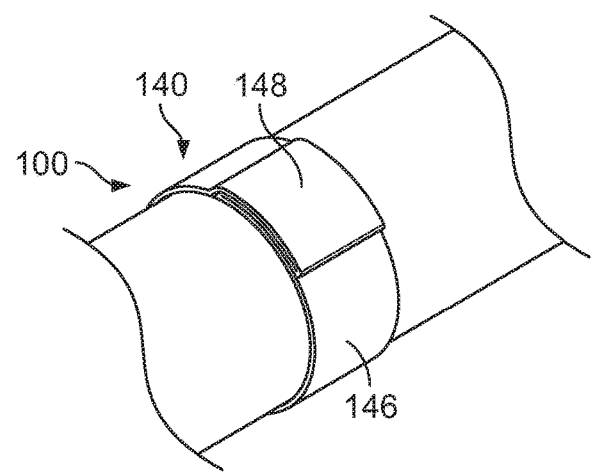

Referring collectively to FIGS. 2, 3, and 4, the braid retainer 140 can include a ferrule 142 that can be formed from a substantially rigid material such as, but not limited to, stainless steel, aluminum, or any other material that can maintain a deformed shape throughout testing and normal use of the fire zone hose 100. The ferrule 142 can include a contact surface 144 for receiving the end 134 of the braided member 130. For example, the contact surface 144 can be formed by an interior surface of the ferrule 142. The end 134 of the braided member 130 can be secured to the thermal protection sleeve 120 by mechanically deforming (e.g., crimping) the ferrule 142 and reducing the diameter defined by the contact surface 144. In one example, the ferrule 142 can include a groove that can protrude from the contact surface 144 of the ferrule 142. The groove can secure the end 134 of the braided member 130 to the thermal protection sleeve 120 with less compression applied to the joint compared with an example without the groove. In some examples, the groove can be applied to the braid retainer 140 after mechanical deformation of the braid retainer 140.

Referring collectively to FIGS. 2, 3, 5, 6, 7, and 8, the braid retainer 140 can include an clamp member 146 (e.g., ear clamp) that can have a deformable portion 148 (e.g., an ear). The clamp member 146 can be formed from a substantially rigid material, as described above with respect to the ferrule 142. The clamp member 146 can include an contact surface 150. The contact surface 150 can receive the end 134 of the braided member 130. The end 134 of the braided member 130 can be secured to the thermal protection sleeve 120 by mechanically deforming and closing the deformable portion 148 (FIG. 7) and reducing the diameter defined by the contact surface 150. After the deformable portion 148 is closed, the deformable portion 148 can be folded over the remainder of the clamp member 146. Accordingly, the deformable portion 148 can be contoured to the shape of the fire zone hose 100. In one example, the clamp member 146 can include a groove 152 that protrudes from the contact surface 150 of the clamp member 146.

Referring again to FIGS. 1 and 2, each of the first end 102 and the second end 104 of the fire zone hose 100 can include a cuff 160. The cuff 160 can be configured to protect the junction between the braid retainer 140 and the braided member 130. The cuff 160 can include an inner surface 164. The inner surface 164 can contact the braid retainer 140 and an outer surface 164. In one example, the inner surface 162 of the cuff 160 can form a recess to mitigate the motion of the braid retainer 140. Additionally, the cuff 160 can be formed around the end 134 of the braided member 130 and the fitting 106. In an additional example, the cuff 160 can be formed from a moldable material such as, for example, silicone or the like. It is noted that, while the outer surface 164 of the cuff 160 is depicted in FIGS. 1 and 2 as being substantially cylindrical, the outer surface 164 of the cuff 160 can be formed into any desired shape.

The fire zone hose 100 can be formed from the components described herein. A method for forming the fire zone hose 100 can include providing the inner tube 110. For example, the inner tube 100 can be manufactured as an initial step. Once the inner tube 100 is formed, the one or more reinforcing layers 126 can be formed over the inner tube 100. A thermal protection sleeve 120 can be formed exterior to the inner tube 110, e.g., the inner tube 110 can be positioned inwards from the inner surface 122 of the thermal protection sleeve 120. In one example, the thermal protection sleeve 120 can be extruded over a top of the one or more reinforcing layers 126 and the inner tube 100.

After the thermal protection sleeve 120 is formed over the inner tube 110, the braided member 130 can be braided over the thermal protection sleeve 120. For example, the inner tube 110 covered by the thermal protection sleeve 120 can be input to a braiding device. The braiding device can be configured to braid or weave the carriers 132 upon the thermal protection sleeve 120 to form the braided member 130. In one example, the carriers 132 can be applied with tension high enough to deform the outer surface 124 of the thermal protection sleeve 120 without deforming inner tube 110. In particular, the outer surface 124 of the thermal protection sleeve 120 can be deformed such that the braided member 130 "bites" into or penetrates the outer surface of the thermal protection sleeve 120. Such a deformation mitigates relative motion between the thermal protection sleeve 120 and the braided member 130.

Once the braided member 130 is formed, the carriers 132 can be trimmed to define the end 134 of the braided member 130. The braid retainer 140 can be secured to the end 134 of the braided member 130 to secure the braided member 130 and mitigate relative motion between the thermal protection sleeve 120 and the braided member 130. Moreover, the braid retainer 140 can mitigate flaring or separation of the carriers 132 and maintain the formation of the braided member 130.

The fitting 106 can be attached to the assembly. In an example, the inner tube 110 and the one or more reinforcing layers 126 can be received within the socket 108 of the fitting 106. The socket 108 can be deformed to seal the inner tube 110 to the fitting 106. The inner surface 114 of the inner tube 110 can be substantially sealed to the fitting 106. Accordingly, pressurized fluid within the flow path 112 can be communicated through the fitting 106 via the flow path 172 defined by the inner wall 170 of the fitting 106. Additionally, the communication of the pressurized fluid through the socket 108 can be substantially prevented during normal operation.

The cuff 106 can be molded over the braid retainer 140 and the socket 108 to protect the hose-to-fitting joint and substantially mitigate premature failures. For example, the cuff 160 can be applied over the top of the braid retainer 140 and the fitting 106 as uncured moldable material and formed into the desired shape. Once the cuff 160 is formed into the desired shape, the cuff 160 can be cured into a final shape.

It should now be understood that the embodiments provided herein relate to hose fittings that can be utilized in aircraft fire zone applications. For example, the hose assembly can be certified as being fire resistant, fire proof, or both. Moreover, the assembly methods described herein do not interfere with the performance of the hose and ensures that the braided member can be retained substantially stationary with respect to the thermal protection sleeve during assembly, product use, and fire exposure. Accordingly, the braid retainer can reliably mitigate loss of material from the thermal protection sleeve and subsequent leaks during fire certification testing. Moreover, the braid retainer improves manufacturing capabilities and yield by ensuring that the carriers do not flare out during assembly, product use, and fire exposure.

It is noted that the terms "substantially" and "about" may be utilized herein to represent an inherent degree of uncertainty that can be attributed to any quantitative comparison, value, measurement, or other representation. These terms are also utilized herein to represent a degree by which a quantitative representation may vary from a stated reference without resulting in a change in the basic function of the subject matter at issue.

Every explicitly described quantitative range described herein should be understood to include every narrower quantitative range that is bounded by the explicitly described quantitative range, as if each narrower quantitative range was expressly described. For example, an explicitly described range of "greater than about 5% and less than about 50%" should be considered to include narrower ranges between (and inclusive of) the minimum value of 5% and the maximum value of 50%; i.e., all ranges beginning with a minimum value of 5% or more and ending with a maximum value of 50%; or less, e.g., 5% to 45%, 10% to 40%, 8% to 42%, etc.

What have been described above are examples. It is, of course, not possible to describe every conceivable combination of components or methods, but one of ordinary skill in the art will recognize that many further combinations and permutations are possible. Accordingly, the disclosure described herein is intended to embrace all such alterations, modifications, and variations that fall within the scope of this application, including the appended claims.

What is claimed is:

1. A method for forming a hose, the method comprising:
forming a thermal protection sleeve exterior to an inner tube, wherein the thermal protection sleeve has an outer surface and the inner tube forms a flow path for conveying fluid;
braiding a plurality of carriers upon the thermal protection sleeve, whereby the carriers form a braided member having an end, and the carriers are applied with tension high enough for the braided member to penetrate the outer surface of the thermal protection sleeve; and
securing the end of the braided member with a braid retainer, and molding a cuff over the end of the braided member and the braid retainer, wherein the braid retainer is formed from a rigid material and the braid retainer is deformed around the end of the braided member.

2. The method of claim 1,
wherein the braid retainer comprises a ferrule having a contact surface that receives the end of the braided member; and
wherein the ferrule comprises a groove protruding from the contact surface.

3. The method of claim 1,
wherein the braid retainer comprises a clamping member comprising a deformable portion and a contact surface that receives the end of the braided member; and
further comprising folding the deformable portion over a remainder of the clamping member.

4. The method of claim 1, wherein the braid retainer comprises a wire member wrapped around the end of the braided member.

* * * * *